United States Patent
Schulz

(10) Patent No.: US 9,995,830 B2
(45) Date of Patent: Jun. 12, 2018

(54) SCINTILLATION EVENT LOCALIZATION IN A RADIATION PARTICLE DETECTOR

(71) Applicant: KONINKLIJKE PHILIPS N.V., Eindhoven (NL)

(72) Inventor: Volkmar Schulz, Wuerselen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days. days.

(21) Appl. No.: 15/128,114

(22) PCT Filed: Mar. 15, 2016

(86) PCT No.: PCT/EP2016/055607
§ 371 (c)(1),
(2) Date: Sep. 22, 2016

(87) PCT Pub. No.: WO2016/146644
PCT Pub. Date: Sep. 22, 2016

(65) Prior Publication Data
US 2017/0371043 A1 Dec. 28, 2017

(30) Foreign Application Priority Data
Mar. 17, 2015 (EP) ..................... 15159432

(51) Int. Cl.
*G01T 1/164* (2006.01)
(52) U.S. Cl.
CPC .................. *G01T 1/1647* (2013.01)
(58) Field of Classification Search
CPC .................................. G01T 1/1647
See application file for complete search history.

(56) References Cited

U.S. PATENT DOCUMENTS 7,026,621 B2   4/2006  Stonger
2010/0038546 A1  2/2010  Schulz
(Continued)

FOREIGN PATENT DOCUMENTS

WO   2010/070487   6/2010
WO   2011/158134   12/2011
WO   2015/028148   3/2015

OTHER PUBLICATIONS

Schulz, et al., "Sensitivity Encoded Silicon Photomultipliers (SeSPs): A novel detector design for uniform crystal identification", Nuclear Science Symposium and Medical Imaging Conference, 2011 IEEE.
(Continued)

*Primary Examiner* — Christine S Kim

(57) ABSTRACT

A method for scintillation event localization in a radiation particle detector includes providing a plurality of scintillator element locations (2') configured to emit a burst of photons responsive to a radiation particle being absorbed at the scintillator element location (2'). A burst of photons emitted by the scintillator element location (2') is detected with a photosensor (5). The photosensor (5) includes an array of single photon avalanche diodes configured to break down responsive to impingement of a photon. Breakdown data (30) is acquired indicative of which of the single photon avalanche diodes are in breakdown. Predetermined photosensor sensitivity data (20, 40) assigns single photon avalanche diodes to groups. Each group is assigned to exactly one scintillator element location (2'). Finally the number of single photon avalanche diodes in breakdown is determined for each group individually to identify the scintillator element location (2') that emitted the burst of photons.

15 Claims, 4 Drawing Sheets

(56) References Cited

U.S. PATENT DOCUMENTS

| | | | |
|---|---|---|---|
| 2011/0017918 A1* | 1/2011 | Baeumer | G01T 1/17 250/370.11 |
| 2011/0101227 A1 | 5/2011 | Tseng | |
| 2011/0248175 A1* | 10/2011 | Frach | G01T 1/2018 250/363.03 |
| 2012/0104260 A1 | 5/2012 | Balakrishnan | |
| 2014/0175294 A1 | 6/2014 | Frach | |
| 2014/0264041 A1 | 9/2014 | Schulz | |
| 2016/0191829 A1* | 6/2016 | Guo | G01T 1/2018 348/301 |
| 2016/0380020 A1* | 12/2016 | Hosono | G01T 1/2018 257/428 |
| 2017/0097426 A1* | 4/2017 | Ramachandra | G01T 1/2023 |

OTHER PUBLICATIONS

Schulz, et al., "Sensitivity encoded silicon photomultiplier—a new sensor for high-resolution PET-MRI", 2013 Institute of Physics and Engineering in Medicine.

* cited by examiner

Fig. 5a
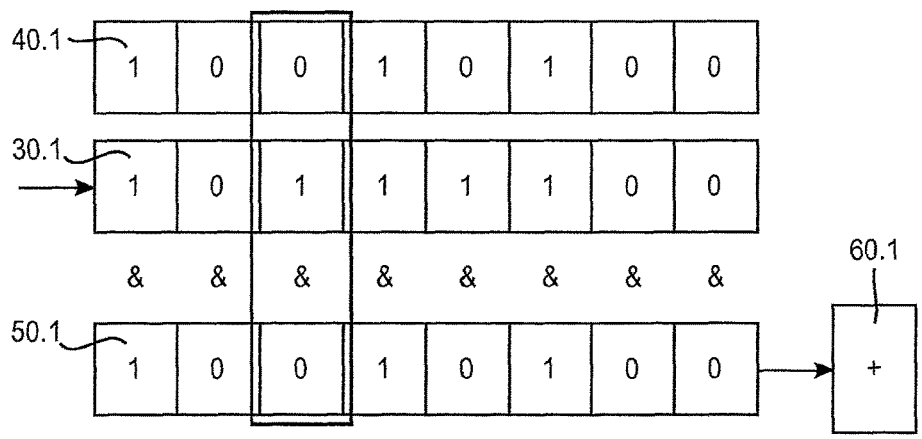
Fig. 5b
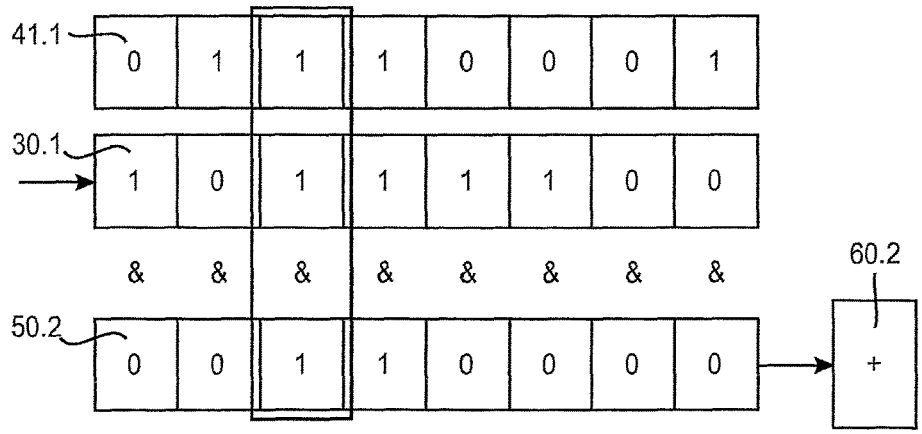
Fig. 5c

SCINTILLATION EVENT LOCALIZATION IN A RADIATION PARTICLE DETECTOR

CROSS REFERENCE TO RELATED APPLICATIONS

This application is the U.S. National Phase application under 35 U.S.C. § 371 of International Application No. PCT/EP2016/055607, filed Mar. 15, 2016, published as WO 2016/146644 on Sep. 22, 2016, which claims the benefit of European Patent Application Number 15159432.2 filed Mar. 17, 2015. These applications are hereby incorporated by reference herein.

FIELD OF THE INVENTION

The present invention relates to the field of radiation particle detectors. It finds particular application in nuclear imaging systems such as, for example positron emission tomography (PET) scanners for clinical or research studies as well as single photon emission computed tomography (SPECT) scanners.

BACKGROUND OF THE INVENTION

In PET scanners pixellated scintillators are typically used to convert incident radiation particles to bursts of photons with a wavelength in the UV or visible spectrum. The scintillators usually comprise a matrix of scintillator elements with a base area in the order of $1 \times 1$ mm$^2$ to $4 \times 4$ mm$^2$. The scintillation events are detected by photosensors coupled to the scintillator elements. State of the art PET scanners use solid-state photosensors, e.g. silicon photomultipliers (SiPMs), typically comprising an array of single photon avalanche diodes (SPADs) configured to break down responsive to impingement of a photon.

Alternatively, monolithic scintillators may be used which consist of a large block of scintillator material. Monolithic scintillators are typically coupled to an array of photosensors configured to localize scintillation events at different scintillator element locations within the monolithic scintillator.

The size of the scintillator element locations that can be identified is a primary factor determining the spatial resolution of the resulting image. Thus, small scintillator element locations are desired to increase the resolution. In the quest for higher resolution solid-state nuclear imaging systems, Anger logic has been used to attain a resolution which is superior to the size of a single photosensor. By coupling the scintillator and the photosensors with a light guide that spreads the emitted scintillation light onto several photosensors and identifying the scintillator element locations with Anger logic, resolution can be improved. Since Anger logic relies on information from neighboring photosensors to identify the scintillator element location, Anger logic becomes inaccurate when information of some of the photosensors is missing, e.g. at gaps and edges of the photosensor array.

Patent application US2014/175294A1 discloses a photon detector that includes a detector array with single photon avalanche diode, SPAD, detectors configured to break down responsive to impingement of a photon. Trigger circuitry is configured to generate a trigger signal responsive to break down of a SPAD detector of the SPAD detector array. Time to digital converter circuitry may generate a digital time stamp for the trigger signal.

SUMMARY OF THE INVENTION

It would be advantageous to improve the identification of scintillator element locations which are smaller than the photosensors employed for detecting the scintillation events. To better address this concern, in a first aspect of the invention a method for scintillation event localization in a radiation particle detector is presented, comprising the steps of:

providing a plurality of scintillator element locations configured to emit a burst of photons responsive to a radiation particle being absorbed at the scintillator element location, detecting a burst of photons emitted by a scintillator element location with a photosensor, wherein the photosensor comprises an array of single photon avalanche diodes configured to break down responsive to impingement of a photon;

acquiring breakdown data indicative of which of the single photon avalanche diodes are in breakdown, providing predetermined photosensor sensitivity data which assign single photon avalanche diodes to groups, wherein each group is assigned to exactly one scintillator element location, and determining the number of single photon avalanche diodes in breakdown for each group individually to identify the scintillator element location that emitted the burst of photons.

According to another aspect of the invention a computer program product for performing the above-mentioned method is presented, comprising instructions configured to perform the steps of acquiring breakdown data indicative of which of the single photon avalanche diodes are in breakdown, providing predetermined photosensor sensitivity data which assign single photon avalanche diodes to groups, wherein each group is assigned to exactly one scintillator element location, and determining the number of single photon avalanche diodes in breakdown for each group individually to identify the scintillator element location that emitted the burst of photons.

According to yet another aspect of the invention a radiation particle detector is presented, comprising:

a plurality of scintillator element locations configured to emit a burst of photons responsive to a radiation particle being absorbed at the scintillator element location, a photosensor comprising an array of single photon avalanche diodes configured to break down responsive to impingement of a photon, wherein the photosensor is configured to acquire breakdown data indicative of which of the single photon avalanche diodes are in breakdown, and a localization unit configured to receive predetermined photosensor sensitivity data assigning single photon avalanche diodes to groups, wherein each group is assigned to exactly one scintillator element location, and to determine the number of single photon avalanche diodes in breakdown for each group individually to identify the scintillator element location that emitted the burst of photons.

Yet another aspect of the invention relates to a nuclear imaging system, comprising:

at least one radiation particle detector as described above, a reconstruction unit for reconstructing outputs of the radiation particle detector into an image representation, and a display for displaying at least a portion of the reconstructed image representation.

According to the present invention breakdown data is acquired that indicates which of the single photon avalanche diodes of the photosensor are in breakdown. Thus, the distribution of scintillation light can be derived from the breakdown data with a resolution only limited by the size of the individual single photon avalanche diodes. The invention further relies on providing predetermined photosensor sensitivity data that assigns certain single photon avalanche diodes to a specific group. Each group is assigned to exactly one scintillator element location. The group defines an area of the photosensor that is mainly sensitive to light emitted by said scintillator element location. The scintillator element location that emitted the burst of photons can be identified by determining the number of single photon avalanche diodes in breakdown for each group. For example, the group with the largest number of single photon avalanche diodes in breakdown can be selected or the group with the largest ratio of the number of diodes in breakdown to the total number of diodes in the group can be selected. Thus, identification of the scintillator element location does not require information from neighboring photosensors. Scintillator element location identification is possible even in those regions of the radiation particle detector where neighboring photosensor information is not available. Due to the high resolution of the breakdown data, scintillator element locations that are smaller than the photosensor can be identified.

According to the invention a scintillator element location may be a location in a monolithic scintillator. Alternatively, a scintillator element location may be a scintillator element in a pixellated scintillator that comprises an array of scintillator elements. The scintillator element of the pixellated scintillator may be optically isolated from neighboring scintillator elements of the pixellated scintillator.

The invention allows to identify scintillator element locations without the need for a light guide. Nevertheless, the invention can be applied to radiation particle detectors using a light guide as well.

Preferably, the photosensor is a digital silicon photomultiplier. Digital silicon photomultipliers integrate an array of single photon avalanche diodes, also known as Geiger-mode avalanche photodiodes (GM-APD), together with the readout circuits on one chip. Advantageously, the digital silicon photomultiplier is configured to output breakdown data for each individual single photon avalanche diode.

According to a preferred embodiment of the invention, the predetermined photosensor sensitivity data assign at least one of the single photon avalanche diodes to more than one group. Assigning the same single photon avalanche diode to more than one group allows to define areas on the photosensor sensitive to different scintillator element locations, wherein those areas overlap each other. Overlapping sensitive areas allow to separate scintillator element locations, in particular scintillator elements of a pixellated scintillator, that are positioned in a staggered fashion on two or more levels of the radiation particle detector in order to allow a depth-of-interaction (DOI) detection.

According to another preferred embodiment of the present invention, the photosensor sensitivity data are generated by irradiating exactly one of the scintillator element locations, in particular one of the scintillator elements of a pixellated scintillator, with radiation particles and determining which of the single photon avalanche diodes are in breakdown. The generation of the photosensor sensitivity data is preferentially carried out as part of a calibration procedure during manufacturing of the radiation particle detector or assembly of the nuclear imaging system. Alternatively, photosensor sensitivity data can be generated during use of the nuclear imaging system, e.g. as part of a daily or weekly calibration procedure, allowing to change and/or reprogram the photosensor sensitivity from time to time.

Advantageously, the photosensor sensitivity data comprises one photosensor sensitivity pattern for each group, wherein the photosensor sensitivity pattern assigns at least one single photon avalanche diode to the group. Using photosensor sensitivity patterns for each group allows simplified data processing as the photosensor sensitivity patterns can be processed by the same processing unit one after the other or by identical processing units in parallel. The photosensor sensitivity pattern may be structured as a mask holding exactly one mask element for each of the single photon avalanche diodes of the photosensor, wherein the mask element indicates if a certain single photon avalanche diode is part of the group or not. Providing the photosensor sensitivity pattern as a mask has the benefit that the step of determining all single photon avalanche diodes of a given group that are in breakdown can be carried out by a logical AND-operation of the breakdown data of the respective single photon avalanche diodes with the sensitivity pattern.

According to an preferred embodiment of the invention the photosensor sensitivity data further comprises a virtual photosensor sensitivity pattern for a virtual group, wherein the virtual group comprises all single photon avalanche diodes of the photosensor that are not assigned to one specific group of the list of other groups. In particular, the virtual group may comprise all single avalanche diodes of the photosensor that are not part of a first group, thereby defining a virtual group that is the inverse of the first group. In order to compute the total number of single photon avalanche diodes in breakdown for the photosensor, the number of single photon avalanche diodes in breakdown of the first group and the virtual group may be added. The total number of single photon avalanche diodes in breakdown may be used to compute the total energy of the scintillation event. Alternatively, a virtual group may be defined that comprises all single photon avalanche diodes of the photosensor. According to a further alternative, the photosensor may provide the total number of single photon avalanche diodes in breakdown on one of its outputs.

Preferably, the breakdown data is acquired responsive to a trigger signal generated by the breakdown of a single avalanche diode. The trigger signal can be generated inside the photodetector and start a procedure to acquire the breakdown data. Advantageously, the acquisition of the breakdown data is delayed by an integration time in order to ensure that most of the photon of the burst have impinged on the photosensor prior to starting the acquisition.

According to another preferred embodiment the breakdown data is acquired in sections of the array. Acquiring the breakdown data in sections allows parallel processing of breakdown data. For example, the breakdown data can be acquired in rows or in columns of the array. That means breakdown data for a complete column or row of the array may be output at once and transferred to the localization unit. Inside the localization unit the breakdown data for the complete column or row can be processed in parallel.

It is further preferred that the breakdown data is provided as a serial bit pattern. Thus, digital processing of the breakdown data is simplified. The individual bits of the bit pattern may carry the information if a given single photon avalanche diode is in breakdown or not.

According to another preferred embodiment of the invention the radiation particle detector comprises a plurality of photosensors, in particular an array of photosensors. The photosensors can be configured to detect a burst of photons emitted by one of the scintillator element locations and acquire breakdown data with single photon avalanche diode resolution individually for each photosensor separately. For each photosensor individual predetermined photosensor sensitivity data may advantageously be provided.

It is further preferred, that the localization unit comprises a photosensor sensitivity memory for storing the photosensor sensitivity data. The photosensor sensitivity memory may advantageously store photosensitivity data of more than one photosensor.

According to a preferred embodiment of the invention the localization unit is connected to a plurality of photosensors. The localization unit may be provided with breakdown data of the plurality of photosensors and with predetermined photosensor sensitivity data of the plurality of photosensors. This allows the localization unit to identify scintillator element locations by using data from neighboring photosensors to identify scintillator element locations that spread onto more than one photosensor.

According to an alternative preferred embodiment of the invention the localization unit is part of the photosensor. Implementing the localization unit as part of the photosensor, e.g. on the same substrate together with the single photon avalanche diodes, offers the advantage of reducing the amount of data output by the photosensor.

According to a preferred embodiment of the invention the nuclear imaging system comprises a plurality of radiation particle detectors disposed in a ring surrounding an imaging region, wherein the reconstruction unit is configured to perform a positron emission tomography reconstruction technique.

These and other aspects of the invention will be apparent from and elucidated with reference to the embodiments described hereinafter.

BRIEF DESCRIPTION OF THE DRAWINGS

FIG. 5a-c are diagrammatic illustrations to illuminate the operations for identifying a scintillator element location in accordance with an embodiment of the inventive method.

DETAILED DESCRIPTION OF EMBODIMENTS

Figure 1:
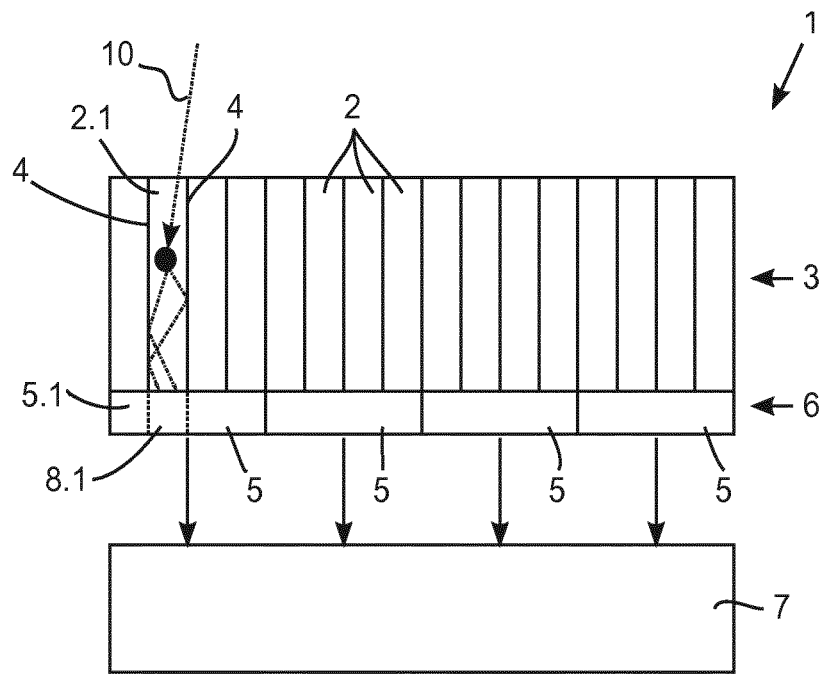
FIG. 1 is a side view of a radiation particle detector in accordance with a first embodiment of the invention.

FIG. 1 illustrates a first embodiment of a radiation particle detector 1 employed in a nuclear imaging system, e.g. a high-resolution PET scanner. The radiation particle detector 1 comprises a pixellated scintillator with a plurality of scintillator element locations, wherein the scintillator element locations are scintillator elements 2. The material of the scintillator elements 2 is selected to provide a high stopping power for 511 keV gamma rays with rapid temporal decay of the scintillation burst. Some suitable scintillator materials are lutetium oxyorthosilicate (LSO), lutetium yttrium orthosilicate (LYSO) and lanthanum bromide (LaBr). It should be appreciated that scintillator elements 2 made of other materials can be used instead. The structure of the scintillator material may for example be crystalline, polycrystalline, or ceramic. The scintillator crystals 2 are arranged in a scintillator layer 3. In order to avoid light sharing between the scintillator crystals 2 a reflector material 4, e.g. a reflective foil, is disposed between neighboring scintillator elements 2. Alternatively, the scintillator crystals 2 can be encased in a reflective coating.

The scintillator elements 2 are directly coupled to a sensor layer 6, e.g. by optical transparent glue. The sensor layer 6 is composed of an array of solid-state photosensors 5. Additionally, an optional planar light guide can be interposed between the scintillator layer 3 and the photosensor layer 6 to allow the scintillation light to be spread onto several photosensors 5. The photosensors 5 are silicon photomultipliers (SiPMs) each comprising an array of single photon avalanche diodes monolithically disposed on a silicon substrate. The photosensor 5 according to this embodiment is a so called digital silicon photomultiplier, which integrates readout circuits together with the single photon avalanche diodes on the same silicon substrate. The single photon avalanche diodes are configured to break down responsive to impingement of a photon. Inside the digital silicon photomultiplier a digital representation of the status of each of the single photon avalanche diodes of the array is available. State of the art digital SiPMs use the digital representation of the breakdown status of all diodes to calculate the sum of all single photon avalanche diodes in breakdown and output the calculated value together with a digital time stamp. The radiation particle detector according to the depicted embodiment of the invention comprises photosensors 5 that are capable of providing breakdown data on a per diode basis on their outputs. Thus, breakdown data indicative of which of the single photon avalanche diodes of the photosensors 5 are in breakdown can be acquired from the photosensors 5.

The radiation particle detector 1 further comprises a localization unit 7. The localization unit 7 is configured to identify the position of a scintillation event on a per crystal basis. Responsive to the detection of a burst of photons by at least one of the photosensors 5, the localization unit 7 determines the scintillator element 2 that emitted the burst of photons. The localization unit 7 according to the first embodiment is implemented as a separate unit connected to a plurality of photosensors 5. Alternatively, the localization unit 7 can be implemented on the same substrate together with the single photon avalanche diodes and the readout electronics, e.g. as part of one photosensor 5 or as a module comprising a plurality of photosensors 5 and the localization unit 7.

The localization unit 7 is configured to receive predetermined photosensor sensitivity data that assigns the single photon avalanche diodes of a given photosensor 5 to different groups. Each group of single photon avalanche diodes corresponds to an experimentally determined distribution of scintillation light emitted by a specific scintillator element 2. Each group is assigned to exactly one scintillator element 2. The localization unit 7 further serves to determine the number of diodes in breakdown for each group and thus allows to identify the scintillator element 2 that emitted the burst of photon as will be explained in the following. The identification can rely on determining the group that has the largest number of single photon avalanche diodes in breakdown. Alternatively, the identification can rely on determining the group that shows the largest ratio of the number of diodes in breakdown to the total number of diodes in the group.

FIG. 1 depicts a gamma ray 10 interacting with a scintillator element 2.1. As a result, a burst of photons with a wavelength in the UV or visible part of the spectrum is emitted by the scintillator element 2.1. The photons are reflected by the reflector 4 and escape the scintillator element 2.1 on the side of the crystal 2.1 that is coupled to the photosensor 5.1. The photons are received by the photosensor 5.1 primarily in the region 8.1 that is situated directly below the scintillator element 2.1. Thus, region 8.1 defines an area of the photosensor 5.1 in which photons originating from scintillator element 2.1 are expected to be detected by the single photon avalanche diodes of photosensor 5.1. Thus, the light distribution of scintillator element 2.1 is confined to region 8.1.

The light distribution of the scintillator elements 2 can be detected in a calibration procedure, wherein each of the scintillator elements 2 is irradiated by gamma rays separately. During the calibration procedure it is determined which of the single photon avalanche diodes are in breakdown. From the breakdown data determined in the calibration procedure, photosensor sensitivity data is generated that maps a given light distribution pattern to a specific scintillator element 2. Photosensor sensitivity data comprises one photosensor sensitivity pattern for each group, wherein the photosensor sensitivity pattern assigns at least one single photon avalanche diode to the group. Photosensor sensitivity patterns store the light distribution produced by a given scintillator element 2 with a resolution corresponding to the size of a single photon avalanche diode. Each group of single photon avalanche diodes is assigned to exactly one scintillator element 2.

The photosensor sensitivity data is stored in the form of photosensor sensitivity patterns in a sensitivity memory of the localization unit 7. During use of the radiation particle detector 1 the photosensor sensitivity data is read and used for identifying a scintillator element 2. With the breakdown data available for a given photosensor 5, the localization unit 7 determines which of the single photon avalanche diodes of said photosensor 5 are in breakdown. The localization unit 7 further determines to which of the groups the single photon avalanche diode belongs to. For each of the groups the localization unit 7 counts the number of single photon avalanche diodes in breakdown and determines the group with the largest number of diodes in breakdown. This group is most likely the group assigned to the scintillator element 2 being the origin of the burst of photons.

The groups defined by the photosensor sensitivity data can comprise different numbers of single photon avalanche diodes. Nevertheless, it is preferred that the number of single photon avalanche diodes in the groups is of equal size. Moreover it is appreciated, that single photon avalanche diodes can be part of more than just one group. This is due to possible overlap of the light distribution of neighboring scintillator elements 2.

Figure 2:
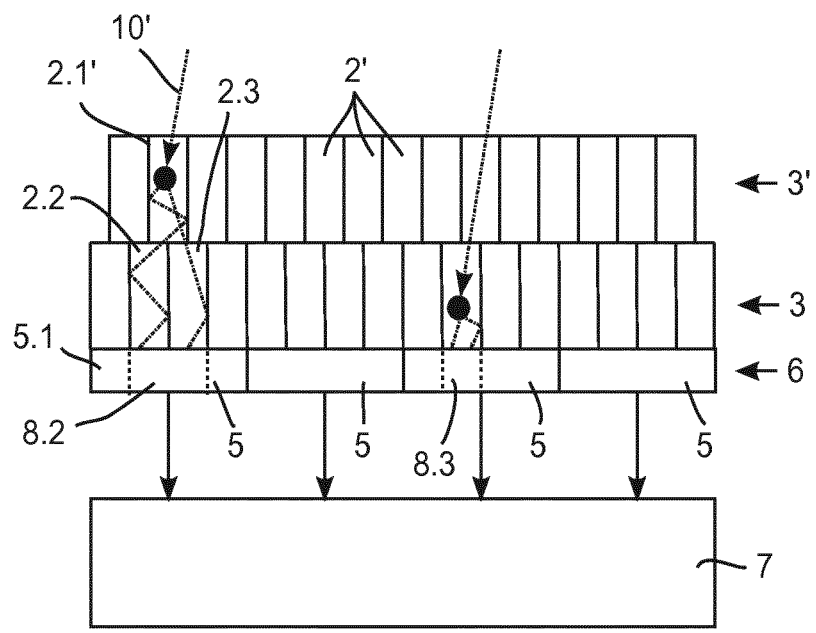
FIG. 2 is a side view of a radiation particle detector in accordance with a second embodiment of the invention.

FIG. 2 depicts a second embodiment of a radiation particle detector 1 according to the invention. The radiation particle detector 1 depicted in FIG. 2 comprises a first scintillator layer 3 coupled to the photosensor layer 6 and a second scintillator layer 3' disposed on top of the first scintillator layer 3. The scintillator elements 2' of the second scintillator layer 3' are offset by half of the pixel pitch from the scintillator elements 2 of the first layer 3. The radiation particle detector 1 according to the second embodiment is employed in a high spatial resolution PET-scanner capable of determining the depth-of-interaction of the gamma rays with the pixellated scintillator.

FIG. 2 illustrates an interaction of gamma ray 10' with scintillator element 2.1' of the second scintillator layer 3'. Gamma ray 10' is stopped in crystal 2.1' and the resulting burst of photons is spread over two neighboring crystals 2.2, 2.3 in the first scintillator layer 3 below the crystal 2.1' in which the interaction took place. The photons are received by the photosensor 5.1 primarily in the region 8.2, which corresponds primarily to the area below the scintillator elements 2.2 and 2.3. Thus, light is detected by photosensor 5 on a larger area compared to an interaction that takes place in the first scintillation layer 3, see region 8.3 as reference. As a consequence overlap of sensitive areas is possible and allows to separate scintillator elements 2' of the second layer 3' and scintillator elements 2 of the first layer 3. Scintillator elements 2, 2' that are positioned in a staggered fashion on two or more levels of the radiation particle detector 1 can be identified without the need for a light guide. Nevertheless, a light guide can optionally be disposed between the first scintillator layer 3 and the photosensor layer 6.

Figure 3:
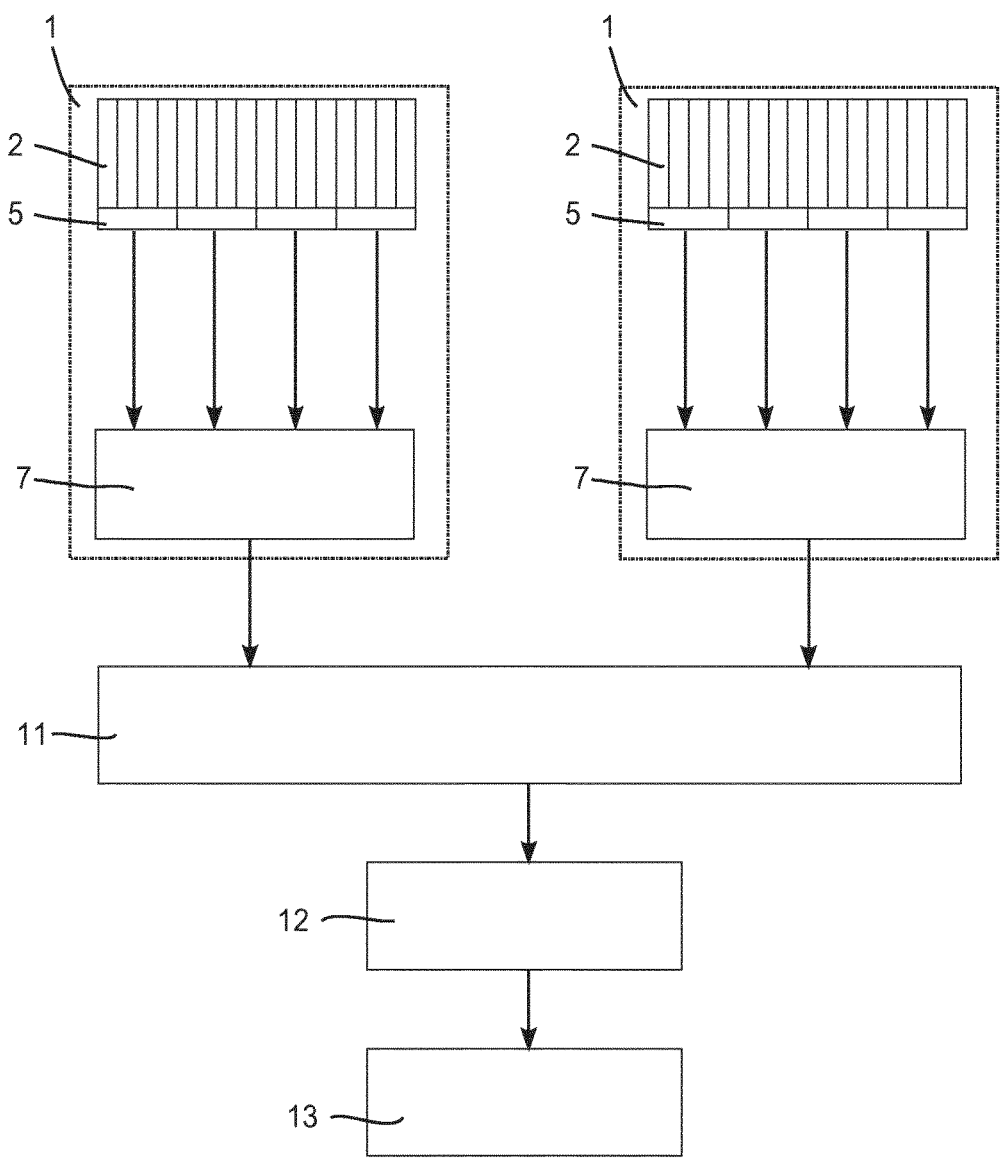
FIG. 3 is a diagrammatic illustration of a nuclear imaging system in accordance with an embodiment of the invention.

FIG. 3 is a diagrammatic illustration of a nuclear imaging system configured as a PET scanner including a plurality of radiation particle detectors 1. The radiation particle detectors 1 are arranged in one or more rings along an axial direction; however other arrangements of radiation particle detectors 1 may be used. The radiation particle detectors 1 surround an examination region. A subject positioned in the examination region has received a radiopharmaceutical which emits gamma rays or other radiation particles of characteristic energy that are detected by the radiation particle detectors 1.

The nuclear imaging system further comprises a reconstruction unit 11 that is configured to perform a positron emission tomography reconstruction technique. The reconstruction unit 11 is connected to a plurality of radiation particle detectors 1 and receives crystal identification data. The reconstruction unit 11 reconstructs the crystal identification data of the radiation particle detectors 1 into an image representation which is stored in a memory 12. A display 13 is connected to the memory 12 for displaying at least a portion of the reconstructed image representation.

Figure 4:
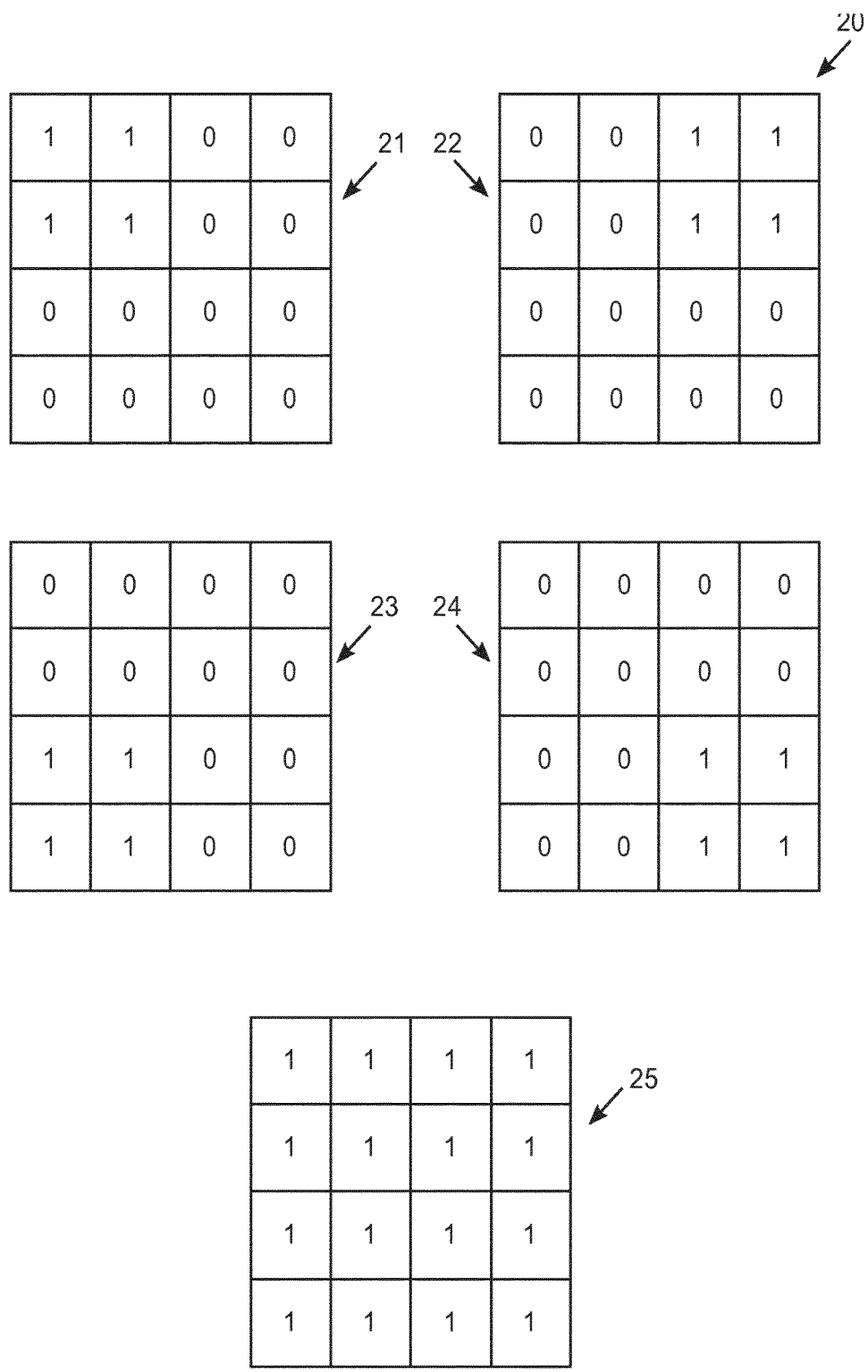
FIG. 4 is a diagrammatic illustration of several photosensor sensitivity patterns.

FIG. 4 illustrates exemplary photosensor sensitivity data 20 in the form of a set of five sensitivity patterns 21, 22, 23, 24, 25 for a photosensor with a 4×4 array of 16 single photon avalanche diodes. The number of 16 diodes is chosen for providing better overview while photosensor arrays typically comprise a number of single photon avalanche diode in the order of 3000 to 6000. The photosensor 5 is coupled to two scintillator layers comprising scintillator elements situated in a staggered fashion to allow depth-of-interaction location. The structure of the sensitivity patterns resembles the structure of the array of single photon avalanche diodes. A "1" indicates that a single photon avalanche is part of a group while a "0" indicates that the diode is not part of the group. In other words the photosensor sensitivity patterns 21, 22, 23, 24, 25 are structured as a mask holding exactly one mask element for each of the single photon avalanche diodes of the photosensor, wherein the mask element indicates if a certain single photon avalanche diode is part of the group or not.

The first sensitivity pattern 21 defines a first group of single photon avalanche diodes. The diodes of the first group are situated in the upper left corner of the array of the photosensor 5. Thus, the first group identifies a scintillator crystal 2 that is located on top of the upper left corner of the photosensor 5. The second sensitivity pattern 22 defines a second group of diodes, which receive light from a scintillator element 2 that is located on top of the upper right corner of the photosensor 5. The third sensitivity pattern 23 and the fourth sensitivity pattern 24 define a third and a fourth group of diodes, located in the lower corners of the photosensor 5 and receiving light from scintillator elements in the located on top of the lower corners of the photosensor, respectively. A fifth group is defined by a fifth sensitivity pattern 25. The fifth group comprises single photon avalanche diodes situated in the middle of the photosensor 5. As depicted in FIG. 4 the fifth group shares diodes with the other groups. In other words, the single photon avalanche diodes of the fifth group are assigned to other groups as well. Thus, there exists an overlap in the light distribution areas, e.g. of the first and the fifth group. This is due to the fact, that the fifth group is assigned to a scintillator element situated in a second layer above the first, second, third and fourth scintillator elements. The photons emitted by said scintillator element of the second layer is spread to all neighboring crystals in the layer below it resulting in a broader light distribution on the surface of the photosensor 5.

Optionally it is possible to define more than five sensitivity patterns for the photosensor 5.

Using FIG. 5 the operations for identifying a scintillator element in accordance with an embodiment of the inventive method will be described in detail in the following.

FIG. 5a illustrates breakdown data 30 acquired by a photosensor 5 indicative of which of the single photon avalanche diodes are in breakdown. Breakdown data 30 is provided as a pattern of single bits, wherein a "1" indicates that a single photon avalanche diode is in breakdown while a "0" indicates that the diode is not in breakdown. Breakdown data 30 is acquired responsive to a trigger signal generated by the photosensor 5 in response to impingement of a photon and delayed by an integration time in the order of several hundred nanoseconds. The breakdown data 30 is acquired in rows 30.1, 30.2, 30.3, 30.4 of the array. That means that acquisition of breakdown data 30 begins with providing a serial bit pattern on an output of the photosensor 5 corresponding to the diodes of a first row 30.1 of the array and continues with serial bit patterns for the second row 30.2 and so forth.

FIG. 5b depicts a first row 40.1 of a given photosensor sensitivity pattern structured as a mask similar to the sensitivity patterns 21, 22, 23, 24, 25 shown in FIG. 4 The photosensor sensitivity pattern defines a first group corresponding to a first scintillator element. In the localization unit 7 a logical AND-operation is carried out, wherein an element of the first row 40.1 of the photosensor sensitivity pattern is combined in an AND-operation with the corresponding element of the first row 30.1 of the breakdown data 30. The result of the logical AND-operation is stored in register 50.1. Finally the sum of all elements of register 50.1 is calculated by an adder 60.1. By carrying out the logical AND-operation and successively calculating the digit sum of the result, the breakdown data 30 is compared to the sensitivity pattern and the number of matches with the predetermined sensitivity pattern is found. The digit sum of register 50.1 corresponds to the number of single photon avalanche diodes in breakdown of the first group. In other words, a conditioned sum is provided that includes breakdown data assigned to a given scintillator element.

FIG. 5c illustrates a second comparison operation that can be carried out in parallel to the first comparison. Here, the first row 30.1 of the breakdown data 30 is compared to the first row 41.1 of a second sensitivity pattern assigned to a second scintillator element. The second sensitivity pattern defines a second group of single photon avalanche diodes. The logical AND of the elements of the patterns 30.1, 41.1 is stored in register 50.2 and the digit sum of register 50.2 is calculated using adder 60.2. The digit sum of register 50.2 corresponds to the number of single photon avalanche diodes in breakdown of the second group.

Finally, the number of single photon avalanche diodes in breakdown of all groups are compared to determine the group with the largest number of single photon avalanche diodes in breakdown. This group is assigned to the scintillator element 2 that emitted the burst of photons. Alternatively, the ratio of the number of diodes in breakdown to the total number of diodes of the group can be compared in order to identify the crystal the photon burst originated from.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the nuclear imaging system is a SPECT scanner. According to an alternative embodiment of the invention a monolithic scintillator may be used instead of a pixellated scintillator, wherein scintillator element locations in the monolithic scintillator are identified instead of scintillator elements of the pixellated scintillator. According to another alternative embodiment of the invention the localization unit 7 is provided as a processor configured to carry out a computer program product, wherein the computer program product comprises instructions configured to perform the steps of acquiring breakdown data 30 indicative of which of the single photon avalanche diodes are in breakdown, providing predetermined photosensor sensitivity data 20, 40 which assign single photon avalanche diodes to groups, wherein each group is assigned to exactly one scintillator element location 2, 2', and determining the number of single photon avalanche diodes in breakdown for each group individually to identify the scintillator element location 2, 2' that emitted the burst of photons. The computer program product may be stored and/or distributed on a suitable medium, such as an optical storage medium or a solid-state medium supplied together with or as part of other hardware, but may also be distributed in other forms, such as via the Internet or other wired or wireless telecommunication systems.

Other variation to the disclosed embodiments can be understood and effected by those skilled in the art in practicing the claimed invention, from study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Furthermore, the terms first, second, third and the like in the description are used for distinguishing between similar elements and not necessarily for describing a sequential or chronological order. Any reference signs in the claims should not be construed as limiting the scope.

The invention claimed is:

1. A method for scintillation event localization in a radiation particle detector, comprising the steps of:
    providing a plurality of scintillator element locations configured to emit a burst of photons responsive to a radiation particle being absorbed at the scintillator element location,
    detecting a burst of photons emitted by a scintillator element location with a photosensor, wherein the photosensor comprises an array of single photon avalanche diodes configured to break down responsive to impingement of a photon;
    acquiring breakdown data indicative of which of the single photon avalanche diodes are in breakdown,
    providing predetermined photosensor sensitivity data which assign single photon avalanche diodes to groups, wherein each group is assigned to exactly one scintillator element location, and determining the number of single photon avalanche diodes in breakdown for each group individually to identify the scintillator element location that emitted the burst of photons.

2. The method according to claim 1, wherein the predetermined photosensor sensitivity data assign at least one of the single photon avalanche diodes to more than one group.

3. The method according to claim 1, wherein the photosensor sensitivity data are generated by irradiating exactly one of the scintillator element locations with radiation particles and determining which of the single photon avalanche diodes are in breakdown.

4. The method according to claim 1, wherein the photosensor sensitivity data comprises one photosensor sensitivity pattern for each group, wherein the photosensor sensitivity pattern assigns at least one single photon avalanche diode to the group.

5. The method according to claim 4, wherein the photosensor sensitivity data further comprises a virtual photosensor sensitivity pattern for a virtual group, wherein the virtual group comprises all single photon avalanche diodes of the photosensor that are not assigned to one specific group of the list of other groups.

6. The method according to claim 1, wherein the breakdown data is acquired responsive to a trigger signal generated by impingement of a photon, optionally delayed by an integration time.

7. The method according to claim 1, wherein the breakdown data is acquired in sections of the array of single photon avalanche diodes, in particular in rows or in columns of the array.

8. A non-transitory computer-readable medium carrying software configured to control one or more processors to:
acquire breakdown data from an array of single photon avalanche diodes disposed to receive photons from a burst of photons emitted from a scintillator element responsive to a radiation particle;
receive photosensor sensitivity data which assigns the single photon avalanche diodes to groups, wherein each group is assigned to exactly one scintillator element location; and
identify the scintillator element location that emitted the burst of photons by determining a number of single photon avalanche diodes in breakdown for each group individually.

9. A radiation particle detector, comprising:
a plurality of scintillator element locations configured to emit a burst of photons responsive to a radiation particle being absorbed at the scintillator element location,
a photosensor comprising an array of single photon avalanche diodes configured to break down responsive to impingement of a photon, wherein the photosensor is configured to acquire breakdown data indicative of which of the single photon avalanche diodes are in breakdown, and
a localization unit configured to receive predetermined photosensor sensitivity data assigning single photon avalanche diodes to groups, wherein each group is assigned to exactly one scintillator element location, and to determine the number of single photon avalanche diodes in breakdown for each group individually to identify the scintillator element location that emitted the burst of photons.

10. The radiation particle detector according to claim 9, wherein the radiation particle detector comprises a plurality of photosensors.

11. The radiation particle detector according to claim 9, wherein the localization unit comprises a photosensor sensitivity memory for storing the photosensor sensitivity data.

12. The radiation particle detector according to claim 9, wherein the localization unit is part of the photosensor.

13. The radiation particle detector according to claim 9, wherein the localization unit is connected to a plurality of photosensors.

14. A nuclear imaging system, comprising
at least one radiation particle detector according to claim 9,
a reconstruction unit for reconstructing outputs of the radiation particle detector into an image representation, and
a display for displaying at least a portion of the reconstructed image representation.

15. A nuclear imaging system according to claim 14, further comprising a plurality of radiation particle detectors disposed in a ring surrounding an imaging region, wherein the reconstruction unit is configured to perform a positron emission tomography reconstruction technique.

* * * * *